Sept. 25, 1962  H. ENGELHARDT ETAL  3,055,207
GAS ANALYSER
Filed April 24, 1959
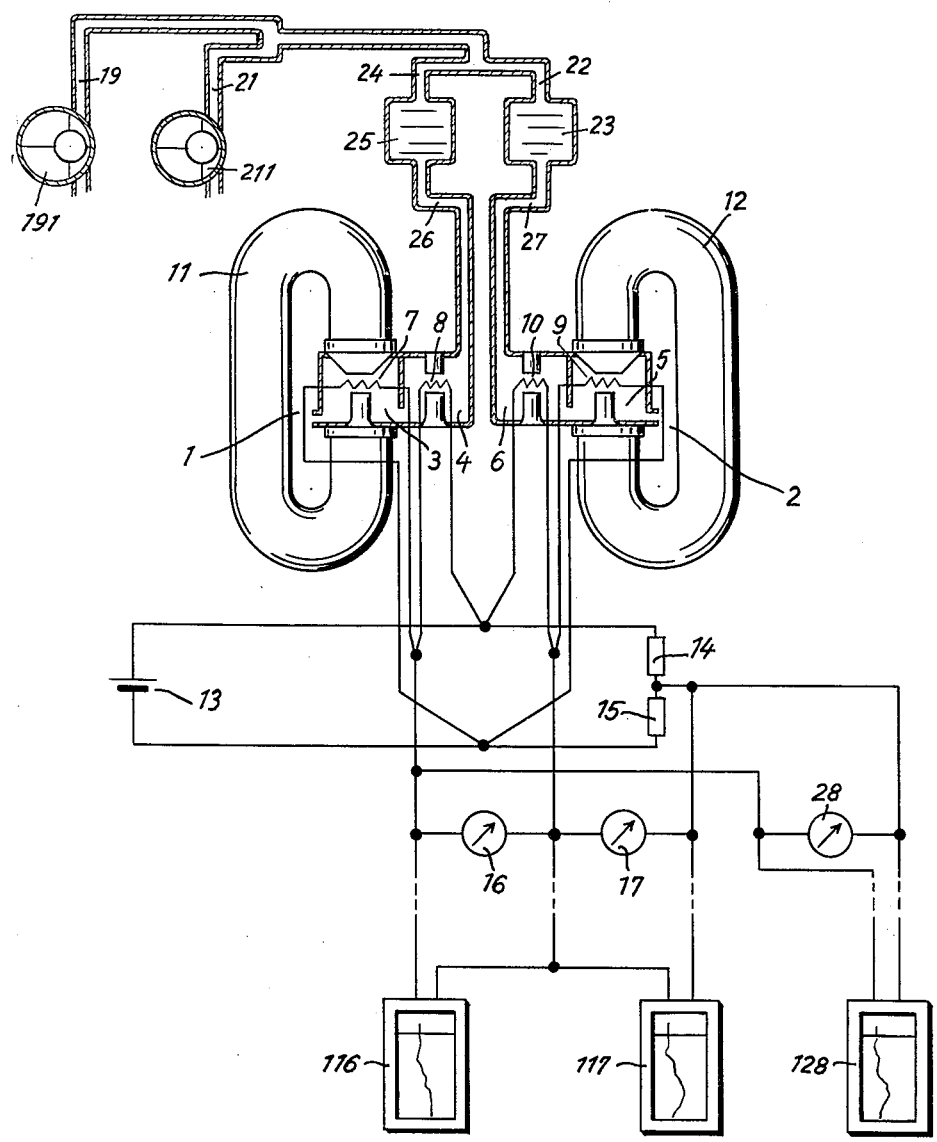

3,055,207
GAS ANALYSER
Heinz Engelhardt, Frankfurt am Main, Stefan Block, Offenbach (Main), and Hans Schlenz, Frankfurt am Main, Germany, assignors to Hartmann & Braun Aktiengesellschaft, Frankfurt am Main, Germany, a corporation of Germany
Filed Apr. 24, 1959, Ser. No. 808,738
Claims priority, application Germany Apr. 29, 1958
5 Claims. (Cl. 73—27)

The invention relates to an apparatus for analysing flue gas and protective gas. The chief object of the invention is to create an apparatus for the accurate analysis of flue gas or exhaust gas of internal combustion engines. An apparatus for testing flue gas, i.e. for ascertaining the unburnt constituents contained in flue gas as well as for measuring the oxygen contained therein, is subject matter of patent application Serial Number 717,006, filed by one of us, Hans Schlenz, February 24, 1958. The present invention relates to an improved construction of this analyser enabling further conclusions on the economy of combustion in a furnace or in an engine. The apparatus of the present invention has the special advantage of ascertaining not only whether the combustion in a furnace or in an engine is economical or not and in which way an economical combustion can be obtained, but enables furthermore to determine in a simple way whether the furnace atmosphere has an oxidizing, reducing or neutral effect. Especially for furnaces used for heat treatment of materials it is of great importance to consider the furnace atmosphere from this point of view. Therefore the apparatus of the invention is most advantageous for supervising ceramic kilns and similar combustion plants. Therefore the use of this apparatus is not limited to this example of application.

The schematic diagram shows the design covered by the invention. It shows two measuring cells for analysing paramagnetic constituents in the gas under test which are generally known as "magnetic oxygen testers." They are designated 1 and 2. The measuring cell 1 includes a test chamber 3 provided with a heater wire 7 and a comparison chamber 4 provided with a wire 8, while the cell 2 includes test and comparison chambers 5 and 6 provided respectively with wires 9 and 10. The chambers 3 and 4, and like manner chambers 5 and 6, are connected together so that the same gas sample in each cell passes through the two chambers of such cell. In chamber 3 an inhomogeneous magnetic field is produced by magnet 11. There is another magnet 12 provided which produces an inhomogeneous magnetic field in chamber 5. The four heated wires 7, 8, 9 and 10 are arranged electrically in a bridge circuit. Feeding of the bridge is achieved by current source 13 at the junctions of heating wires 7 with 9 and 8 with 10. Two series resistors 14 and 15 are also connected to the feeding points of the bridge, that means at the points where the heating wire bridge is connected to voltage source 13. Between the corner points of the bridge where resistors 7, 8 and 9, 10 are connected with each other an electrical measuring instrument 16 is connected and in parallel to this instrument the recorder 116 is arranged. Another electrical measuring instrument 17 is connected between the junction of the two heating wires 9 and 10 and the junction of resistors 14 and 15. Recorder 117 is also connected in parallel to indicator 17. Between the junction of heating wires 7 and 8 and that of resistors 14 and 15 an indicator 28 is connected with recorder 128 arranged in parallel.

The gas under test is aspirated from the sampling point by pump 191 and fed to the analyser through pipe 19. In case of requirement another pump 211 provides for aspiration of a definite quantity of air or oxygen which is also fed to the analyser through line 21. A partial flow of the gas under test is fed to reaction chamber 25 through line 24 where due to special means such as a heating or ignition device a combustion of the unburnt constituents with the originally existing or added oxygen takes place. After the combustion the gas leaves the combustion chamber 25 via line 26 and enters analyser 1 with measuring chambers 3 and 4 from where it escapes into the open air. Another partial flow of the analysis gas mixed with air passes line 22 and enters the flow compensation chamber 23 having the same flow resistance as reaction chamber 25. From there it flows via line 27 into gas analyser 2 with chambers 5 and 6 from where it can also escape into the open air.

The gas flowing through chambers 5 and 6 of analyser 2 is identical with the gas aspirated at the sampling point of the furnace to be supervised, apart from an admixture, if required, of a definite constant percentage of oxygen using dosing pump 211. This gas surrounds the two heating wires 9 and 10 in chambers 5 and 6 of analyser 2. Heating wire 9 being arranged in an inhomogeneous magnetic field, besides thermal convection a so-called magnetic wind is produced in the environment of this heating wire if the gas under test contains oxygen or another paramagnetic gas. Around heating wire 10 only a usual thermal convection is produced because this wire is not disposed in an inhomogeneous magnetic field. Due to the magnetic wind the heating wire 9 is subjected to more cooling than heated wire 10. The difference of cooling between heating wires 9 and 10 and therefore the difference of their resistance depends on the oxygen content of the gas under test. However the composition of the gas flowing through chambers 3 and 4 of analyser 1 no longer corresponds to the gas aspirated at the sampling point to which a certain percentage of oxygen has been added. As part of the original oxygen in combustion chamber 25 has been used for the combustion of combustible constituents in the gas under test, this oxygen content is lower than that of the gas flowing through chambers 5 and 6 of analyser 2. The gas leaving combustion chamber 25 surrounds heating wires 7 and 8 of chambers 3 and 4 of analyser 1, heating wire 7 being arranged in an inhomogeneous magnetic field which is not the case for wire 8. Due to the magnetic wind produced in the inhomogeneous magnetic field in the presence of oxygen the heating wire 7 is cooled more than heating wire 8. The temperature difference between both heating wires 7 and 8 and consequently the difference of their resistance corresponds to the oxygen content of the gas leaving combustion chamber 25 through lines 26 and entering measuring chambers 3 and 4. Therefore by means of the gas analysis cell 2 the oxygen content of the original gas or the gas after admixture of a certain quantity of air is measured, whereas in analysis cell 1 the oxygen content of the gas under test (with added air, if necessary) is measured after the combustion of the originally contained combustible constituents.

The difference of the oxygen content in the original gas and in the gas after the combustion of combustible constituents measured in cells 1 and 2 becomes effective as diagonal voltage of the bridge consisting of resistors 7, 8, 9, 10 and can be read off the indicator 16 and recorded by means of instrument 116. The indication of instrument 16 not only corresponds to the decrease of oxygen in the gas under test due to combustion of unburnt constituents, but corresponds also to the percentage of burnt constituents of the gas under test. Therefore the indication of instrument 16 also serves as measure for the heating value of unburnt combustible constituents contained in the gas under test and consequently is to be considered a measure for the instantaneous economy of the plant to be supervised.

For supervising furnaces and internal combustion engines it is not sufficient to known the content of unburnt constituents in the gas under test, but it is also necessary to know the excess oxygen of the gas under test. Furthermore for judging on the oxidizing and reducing properties of flue gas and protective gas in ceramic kilns and other combustion plants it is of great importance to know whether the gas contains more oxygen than actually required for the combustion of the unburnt constituents or whether the oxygen existing in the gas under test would be sufficient for the combustion of unburnt constituents. Flue gas and protective gas always contain a certain percentage of unburnt constituents as well as oxygen because the combustion in the furnace to be supervised is never complete even with theoretically correct adjustment of the quantity of fuel and air. The gas has an oxidizing effect if the oxygen content is higher than actually required for the combustion of the unburnt constituents. On the other hand the gas has a reducing effect if the oxygen content is lower than required for the combustion of unburnt constituents. The gas is to be considered neutral if the oxygen content is just sufficient for the combustion of unburnt constituents in the gas.

For drawing such conclusions on the gas under test using the analyser of the invention, the two resistors 14 and 15 having approximately the resistance of the heating wires 9 and 10 are connected in parallel to heating wires 9 and 10 in chambers 5 and 6 of analyser 2. The junction of both resistors 15 and 14 is connected via instrument 17 with the junction of the heating wire resistances 9 and 10. Another measuring instrument 28 and recorder 128 connected in series are inserted between the junction of resistors 14 and 15 and the junction of heating wire resistors 7 and 8. The resistances of instruments 16, 17 and 28 as well as recorders 116, 117 and 128 have been chosen in such a way that they equal each other. The content of unburnt constituents of the gas under test is read off indicator 16 and the absolute oxygen content is indicated by instrument 17. Instrument 28 indicates whether the gas under test has an oxidizing, reducing or neutral effect.

A certain percentage of oxygen can be added using pump 211 if the original gas does not contain enough oxygen, otherwise the pump may be shut down or dispensed with and line 21 is closed. When adding a certain percentage of oxygen or air to the original gas using pump 211, the added quantity of oxygen has to be considered for the oxygen measurement of instrument 17 and the measurement of oxidizing or reducing properties by means of instrument 28. This is achieved by suppressing the zero point of the instruments according to the added oxygen.

We claim:

1. An apparatus for analysing flue gas and protective gas comprising two magnetic oxygen analysing cells each being provided with a heater wire in an inhomogeneous magnetic field and comparison heater wire without magnetic field, the four heater wires being serially connected, with the comparison wires having a common junction, and forming four arms of a bridge, feed means for supplying current to the bridge at said junction and the junction diagonally opposite, two serially connected resistors connected into the bridge at the two mentioned junctions, an electrical meter connected at the remaining diagonally opposite arm-junctions, and two electrical meters, each connected respectively to one of said arm-junctions and both to the junction of the two resistors, the resistance of the meters and the bridge being of values to make the reading of the first meter equal to the sum of the readings of the other two meters.

2. An apparatus for analysing flue gas and protective gas for combustible or reducing substances comprising first and second magnetic oxygen analysers each containing two heated wires, one in an inhomogeneous magnetic field and another in a space without magnetic field, said four heated wires being connected in an electric bridge fed by a current source, an electric measuring instrument for determining the diagonal voltage of the heated wire bridge, two substantially like resistances arranged in series and connected across the current source for feeding the heated wire bridge, another electrical measuring instrument connected with one point of the bridge diagonal of said second analyser and with the junction of said two resistances, a third electrical measuring instrument connected to the opposite point of the diagonal and to said junction, means for dividing the gas flow into two partial flows, a combustion chamber for burning the unburnt components of the flue gas in one partial flow, means for feeding this partial flow to the first magnetic oxygen analyser and means for feeding the second partial flow to the second magnetic oxygen analyser.

3. An apparatus for analysing flue and protective gas for oxygen and combustible reducing substances comprising two analysis cells for producing electrical outputs proportional respectively to the oxygen and unburnt constituents in the gas under test, two electrical instruments for measuring the respective electrical outputs, and a third electrical measuring instrument so connected with the cells to indicate a function of the difference of said outputs.

4. An apparatus for analyzing flue and protective gases for oxygen and combustible reducing substances comprising two analysis cells for producing electrical outputs as a function of the oxygen content and substantially proportional to the content of unburnt constituents respectively, two electrical instruments for measuring the respective elecrical outputs, and a third electrical measuring instrument so connected with the cell to indicate a function of the difference of said outputs.

5. An apparatus as claimed in claim 4, and means for adding excess oxygen to the gas under test before the gas enters the oxygen cell, the third measuring instrument being a suppressible zero instrument for compensating for the addition of the excess oxygen.

References Cited in the file of this patent

UNITED STATES PATENTS

| 1,644,951 | Rodhe | Oct. 11, 1927 |
| 2,591,761 | Zaikowsky | Apr. 8, 1952 |
| 2,633,737 | Richardson | Apr. 7, 1953 |
| 2,763,151 | Richardson | Sept. 18, 1956 |
| 2,944,418 | Engelhardt | July 12, 1960 |

FOREIGN PATENTS

| 724,041 | Germany | Aug. 17, 1942 |